United States Patent [19]
Giebeler
[11] Patent Number: 4,827,197
[45] Date of Patent: May 2, 1989

[54] METHOD AND APPARATUS FOR OVERSPEED PROTECTION FOR HIGH SPEED CENTRIFUGES

[75] Inventor: Robert Giebeler, Cupertino, Calif.

[73] Assignee: Beckman Instruments, Inc., Fullerton, Calif.

[21] Appl. No.: 53,989

[22] Filed: May 22, 1987

[51] Int. Cl.[4] .......... H02P 5/28

[52] U.S. Cl. .......... 318/3; 494/9; 494/10; 361/23; 388/930; 388/933; 388/903; 388/904

[58] Field of Search .......... 361/23; 494/1, 7, 9, 494/10, 12; 318/302, 305, 310, 318, 325, 326–327, 730, 767, 772, 798–799, 812, 461–464

[56] References Cited

U.S. PATENT DOCUMENTS

| | | | |
|---|---|---|---|
| 3,436,637 | 4/1969 | Ehret | 318/318 |
| 3,921,047 | 11/1975 | Carter et al. | 318/313 |
| 4,284,931 | 8/1981 | Ehret | 318/318 |
| 4,286,203 | 8/1981 | Ehret | 318/314 |
| 4,470,092 | 9/1984 | Lombardi | 361/23 |
| 4,568,325 | 2/1986 | Cheng et al. | 494/84 |
| 4,700,117 | 10/1987 | Giebelen et al. | 318/327 |

*Primary Examiner*—William M. Shoop, Jr.
*Assistant Examiner*—David Martin
*Attorney, Agent, or Firm*—William H. May; Paul R. Harder

[57] ABSTRACT

An apparatus and method of protecting a centrifuge from rotor overspeed and resultant mishap by computation of the rotor moment of inertia is disclosed. In the preferred embodiment, a centrifuge is driven by a rotor mounted on a shaft which shaft is in turn driven by a constant current motor. A tachometer for detecting angular velocity of the drive shaft is used. A desired and ultimate centrifuge operating speed is selected by the operator. The times at which the rotor passes through discrete speeds are recorded and from the time difference the moment of inertia is computed. The moment of inertia can thereafter be utilized to discretely identify or "finger print" rotors to disqualify certain rotors from use in particular centrifuge protocols and establish gross limits of centrifuge operating speed.

17 Claims, 5 Drawing Sheets

METHOD AND APPARATUS FOR OVERSPEED PROTECTION FOR HIGH SPEED CENTRIFUGES

FIELD OF THE INVENTION

This invention relates to a method and apparatus for protection against mishap due to centrifuge overspeed in excess of established rotor stress limitations.

BACKGROUND OF THE INVENTION

Analytical and preparative centrifuges for use in experimental biology and biochemistry, as well as diagnostic applications, are required to run at high speeds (up to 100,000 revolutions per minute-RPM) in order to accomplish gradient or related separations. The faster the speed, the more refined the separations or the quicker one can complete scientific analysis on the sample as part of an integrated laboratory procedure. High speeds must be attained through the rapid and smooth acceleration, and later deceleration, of the centrifuge rotor, so that biological samples and sample band distributions are not significantly altered and samples are preserved. The speeds attainable by a centrifuge rotor are limited by the stress in the rotor, and maximum amount of kinetic energy that the centrifuge housing and barrier ring may safely contain.

As a rotor is accelerated up to a maximum speed for its rating, defects in the motor, centrifuge rotor, or control system can lead to rotor mishap. Rotor mishap is associated with faulty rotors, motors, or control systems conventionally available for monitoring and controlling the centrifuge rotor speed. In the event that a high speed rotor disconnects from the drive shaft, or otherwise fails to function as designed, such a rotor will be capable of releasing large amounts of kinetic energy. In order to ensure the safety of the user, and the integrity of the centrifuge apparatus, conventionally the steel barrier-ring residing within the centrifuge housing surrounds the rotor and motor assembly for the purpose of containment of the rotor in the event of a mishap.

As a preliminary safeguard, various fail safe systems may be installed to cooperate with the centrifuge apparatus to control the speed of the rotor and identify a particular rotor to ascertain whether a given rotor is operating beyond the limitations recommended for its safe use. For example, motor speed may be controlled according to the teachings of U.S. Pat. Nos. 3,436,637, 4,284,931, and 4,286,203 all to Ehret (assigned to the assigneee of this application). Additionally, a method of rotor identification, through the use of optically sensed overspeed discs affixed to each rotor, as taught in U.S. Pat. No. 3,921,047 (assigned to the assignee of this application) allows the centrifuge operating system to detect when a given rotor has reached or exceeded its approved operating rating. Mechanical safeguards, such as a breakaway rotor base, as described in U.S. Pat. No. 4,568,325 to Cheng and Chulay (assigned to the assignee of this application), have been used in an attempt to prevent the release of unexcessive kinetic energy by causing the rotor to safely fail prior to a release of kinetic energy which exceeds the containment limits of the centrifuge housing and barrier ring.

As an alternative, speed control and rotor identification schemes have been developed which uses a magnetic detector to sense a changing magnetic flux generated by a plurality of magnets embedded in the base of each rotor. As the rotor whirls past the magnetic detector, both speed and rotor identification may be ascertained in order to detect rotor operating conditions before abnormal conditions deteriorate into rotor mishap. This detection scheme may use the magnetic signal to detect rotor imbalance and to control rotor speed as a function of the motor timing signals.

Heretofore, no matter how many security and control systems were implemented to assure rotor safety, the ultimate fail safe device has been the conventional steel barrier ring which surrounds the rotor assembly within the centrifuge housing. In the event of rotor mishap, the barrier ring has been designed to contain the forces which arise during rotor mishap, and prevent the rotor from injuring the property or the person of the operator. A heavy barrier lid on the top of the centrifuge cabinet acts as an additional blockage for the containment of any rotor mishap.

Reliance on prior identification, such as rotor I.D. schemes, must not be the only back-up system for speed limiting the rotor, since conventional rotor identification relies on the accuracy of the identification label, which may be improperly installed.

STATEMENT OF THE PROBLEM

There are presently identified three classes of casualties that can be associated with rotor failures.

First, and for relatively large diameter rotors, large amounts of angular momentum are dissipated in the casualty. Disintegration of such rotors causes corresponding rotation of the machines in which the disintegration takes place. It is a hazard to those working around such machines that the machines themselves may suddenly rotate to dissipate this angular momentum.

Second, and for the middle diameter range of rotors, there is danger that the total amount of energy contained by the rotor may exceed the capability of the mechanical containment system. To date, all mechanical containment systems are usually manufactured to have sufficient energy containment capabilities to prevent and contain any disintegrating rotor.

Thirdly, and as associated with small, very high speed rotors, the immediate dissipation of energy is suspected to release such high bursts of energy that chemical reactions may occur. Resulting explosions could breach the containment capabilities designed into an instrument.

It will be understood that operator error can likewise endanger rotors. For example, some rotor constructions after a given number of "cycles" routinely have their top rated speed reduced. This reduction of the top rated speeds is now carried out by replacing the overspeed disk or optically recognized data on the bottom of the disk. It has been known that with such replacements operator error has caused the wrong overspeed disk to be placed on a rotor. When the wrong disk is on the rotor, it is sometimes given a speed wherein disintegration can occur.

In any event, where there is a rotor disintegration, there is a need for complete repair of the centrifuge. The vacuum container is destroyed. The refrigeration system is damaged, usually beyond repair. The rotor must be analyzed. Questions of responsibility for repair are presented. In short, for both the manfacturer and the customer, anything that can be done to prevent rotor casualties, is desired.

SUMMARY OF THE INVENTION

This invention relates to an apparatus and method of protecting a centrifuge from rotor overspeed and mishap by computation of the rotor moment of inertia.

The system for safeguarding against centrifuge rotor mishap includes using the computed moment of inertia to "finger print" or discretely identify the rotor, disqualifying certain rotors from use in particular centrifuge protocols and establish gross limits of centrifuge speed.

The centrifuge has a centrifuge motor mounted upon a shaft and driven by a centrifuge motor. In the preferred embodiment, a tachometer for detecting angular velocity of the drive shaft is used. A desired and ultimate centrifuge operating speed is selected by the operator. By monitoring the current to the motor, the torque that the motor exerts on the rotor can be determined, since motor torque is a function of current. Once these quantities are derived, a computer determines the kinetic energy the rotor will have when it reaches the selected desired and ultimate speed, according to the equation:

$$KE = \tfrac{1}{2} I\omega^2 \quad (1)$$

$$I = \frac{\tau t}{\omega_2 - \omega_1} \quad (2)$$

where $\tau$ is torque, t is time, $\omega$ is the preselected angular velocity, and $\omega_2$ and $\omega_1$ are measured angular velocities over the time period t, KE is kinetic energy and I is the moment of inertia.

Once the computer had calculated the moment of inertia I for a particular rotor has been calculated, the information can be used for positive identification or "finger printing" of the rotor.

Secondly, the calculated moment of inertia can be used to disqualify rotors for either the centrifuge protocol selected or for use with a particular centrifuge apparatus. For example, where rotors are interchanged by the customer in derogation of the safety instructions of the manufacturer, the rotors can be identified and centrifuging stopped or prevented.

Thirdly, even where the discrete identit of the rotor is not known through calculation of its particular and "finger printing" moment of inertia, gross energy limits for rotors having that general moment of inertia can be used to limit rotor speed. Thus, centrifuging can be limited to gross energy limits for preventing rotation of the centrifuge upon a casualty occurring, for energies that exceed the mechanical containment limits of the system, and for energies that will not cause rotor disintegration with resulting chemical reactions.

DETAILED DESCRIPTION OF THE PREFERRED EMBODIMENT

Figure 1:
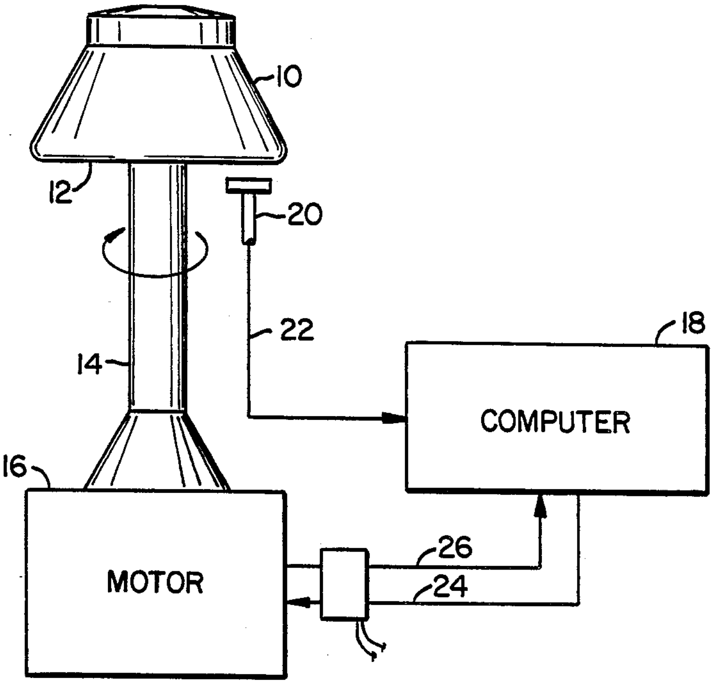
FIG. 1 shows a schematic configuration of the physical components of this invention.

With reference to FIG. 1, there is shown the mechanical and electronic components included within the rotor overspeed protection system. These components work in conjunction with a conventional centrifuge.

The conventional centrifuge assembly comprises a rotor 10 mount on a rotating shaft 14, the shaft being driven by a motor system 16. The motor system 16 may include an AC inductive polyphase motor driven by a motor controller or inverter, housed (but not separately shown), within the motor system 16.

The motor inverter may be driven by a timing circuit, such as a Johnson counter (not shown), which is controllable by the computer 18.

The computer 18 controls the speed and operation of the motor system 16 and thereby controls the operation of the centrifuge shaft 14 and rotor 10. The computer 18 is able to adjust rotor speed by reacting to real-time daeta which is transmitted from the tachometer 20 (which reads optical or magnetic data from the underside 12 of the rotor 10) along pathway 22 and/or from the motor 16 along pathway 26 to the computer 18. The motor 16 receives its speed and current instructions from the computer 18 over pathway 24.

As is known previously, most centrifuge systems are adaptable for interchangeable rotors. The rotor 10 may conventionally be removed from the shaft 14, and replaced by a rotor of a difference mass and diameter. The centrifuge housing is conventionally designed to withstand the kinetic energy released during a rotor mishap, if when the rotor 10 which fails is of large diameter and mass.

The kinetic energy (K.E.) of the rotor 10, shaft 14, and motor 16 assembly may be determined according to the kinetic energy equation, well known in the engineering arts, namely:

$$\text{Total K.E.} = \tfrac{1}{2} I\omega^2,$$

where, I=total moment of inertia for the rotor, shaft, and motor; and, $\omega$=angular velocity of the rotor at the speed set by the operator.

The total moment of inertia (I) may be divided into moments of inertia for the rotor, shaft, and motor. Since the shaft and motor are fixed and known quantities, the only variable of concern is the moment of inertia for the interchangeable rotor 10. Hereinafter, ($I_{rotor}$) will mean the moment of inertia of the rotor only, with the understanding in the preferred embodiment that the moments of inertia for the shaft and motor may be added to the rotor's moment of inertia to determine a total moment of inertia for the rotor, shaft, and motor system, i.e.:

$$I = I_{motor} + I_{shaft} + I_{rotor}, \text{ where}$$

$$I_{motor} + I_{shaft} <<< I_{rotor},$$

so that $I_{rotor} = I$.

In order for the computer to determine the moment of inertia of the rotor 10, without the use of rotor identification data, the moment of inertia of the rotor must be derived according to the equation:

$$I_{rotor}=\sigma/\alpha;\text{ where,}$$

$\tau$=rotor torque; and, $\alpha$=angular acceleration. In turn, in order to derive angular acceleration, one must resort to the definition of angular acceleration, namely:

$$\alpha = \frac{\Delta\omega}{\Delta_t} = \frac{\omega_2 - \omega_1}{t_2 - t_1}$$

Thus, angular acceleration ($\alpha$) may be derived by determining angular velocity ($\omega_1$) at a first time ($t_1$) and the angular velocity ($\omega_2$) at a second time ($t_2$), by readings taken by the tachometer 20 reading the underside 12 of the rotor 10. So, $$I_{rotor} = \frac{\tau}{\alpha} = \tau \cdot \left(\frac{t_2}{\omega_2 - \omega_1}\right),\text{ where } t_1 = 0.$$

Once angular acceleration ($\alpha$) is determined, ($\tau$) rotor torque may be derived. Rotor torque $\tau$ may be conventionally derived as by a torque monitor. However, such monitors are very difficult to place and to read at the high speeds used in modern or so-called "ultracentrifuges." Therefore, resort to determination of motor torque form motor current is preferred. It is known from theoretical and experiment data that ($\tau$ torque is proportional to the square of the motor current (i), according to the equation:

$$\tau = \frac{Km\, i^2 r^2}{s}(1 - s)RPM,$$

wherein, i is the motor current; K is an empirically derived constant; RPM is the number of revolutions per minute; m is the motor mass; r is a known resistance; and s is motor slip. Of the above quantities, only (i) current and RPM (speed) will vary from rotor to rotor. These quantities, current and speed, may be easily determined through conventional and known methods.

Where current is constant to an induction motor, the torque is constant and proportionate to the current. In this manner, the torque may be determined as a function of current and speed. Torque may be empirically derived by calculating, for a known rotor and known moment of inertia ($I_{rotor}$) may be determined from calculated torque ($\tau$) and angular acceleration ($\alpha$) without resort to other rotor identification techniques.

The method of determination of the moment of inertia ($I_{rotor}$) can be used to identify or finger print a rotor. First angular acceleration is determined. Thereafter, torque is either computed or held to a constant value. Division of torque by angular acceleration yields moment of inertia (by definition). Thus, with the computed angular acceleration and input of torque, the moment of inertia becomes immediately known.

There results a method and apparatus of rotor classification where no reliance need be placed on supplemental identification techniques. Thus reading magnetic identification, optical identification or relying on an operator to accurately "key in" rotor identification is not required.

When the rotor identification is determined, speed settings directly related to that particularly identified rotor can be used to limit the centrifuge to safe operating limits. Thus, where a particular titanium rotor is identified in a "look up table" in a computer, subsequent centrifuge operation with that rotor installed can be limited to those values previously entered in the look-up table. This will be illustrated with respect to the computer flow chart of FIGS. 2 and 3.

Alternatively, computer rotor moment of inertia can be compared to set speed (rpm) limits in the centrifuge controlling computer. These set speed limits can be used to compute total kinetic energy to be attained in the rotor before that speed is in fact attained. This total anticipated kinetic energy can then be compared to the total kinetic energy that can be tolerated by the particular rotor or by the centrifuge containment system. Where the moment of computed inertia is not found in a look-up table, centrifuging can be stopped altogether.

There is disclosed, a gross method of kinetic energy limitation according to the computed moment of inertia. Rotors are divided in to energy classes according to their moment of inertia. Once a rotor is classified into such a class by a computed moment of inertia, a kinetic energy limit is set by speed limitations which the rotor is not allowed to exceed.

Having set forth the theory relating to this invention, applicant will now set forth several practical examples.

Figure 2:
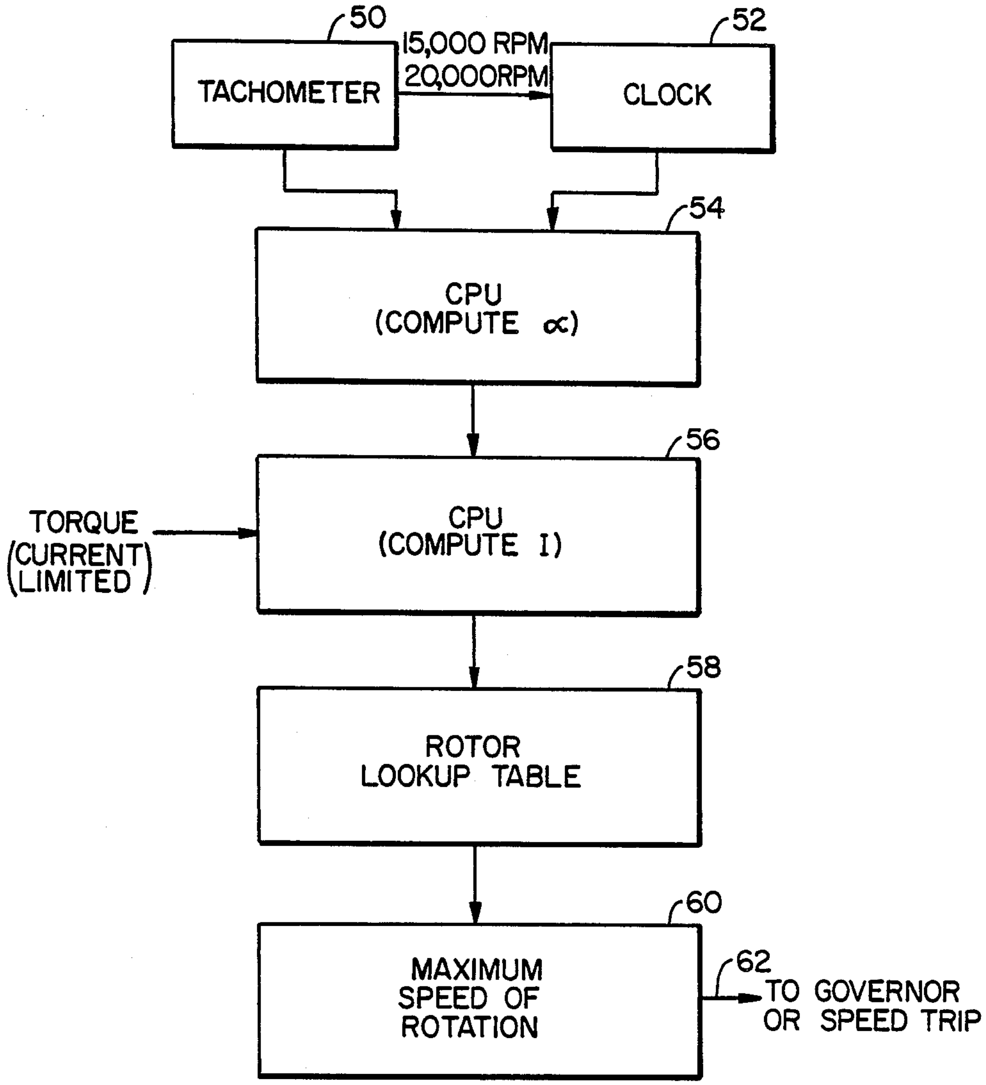
FIG. 2 is a computer flow diagram for computing total moment of inertia when torque is conventionally determined and using the computed moment of inertia to read a look-up table (wherein the rotor is discretely identified) to output a limiting speed to a governor.

Referring to FIG. 2, a tachometer 50 is set to output a first signal to a clock 52 at 15,000 rpm. Clock 52 in turn outputs to the CPU a first time signal.

Tachometer 50 then outputs a second signal to clock 52 at 20,000 rpm. The clock outputs a second signal and immediately computes at step 54 angular acceleration.

Presuming that the current to the motor between 15,000 and 20,000 rpms is controlled to a constant value, torque is known. Therefore, the moment of inertia may be directly and instantaneously computed at 56. The moment of inertia I is then passed to rotor look-up table 58. For rotors having a general moment of inertia I, close to the computed moment of inertia I, a maximum speed of rotation may be computed at 60. This limiting speed of rotation is passed to conventional governor apparatus or speed trips for preventing overspeed of the rotor.

It will be appreciated that in the protocol of FIG. 2 the rotor was identified in the rotor look-up table. The computed moment of inertia can be used to address the look-up table. The value at the address can be maximum speed. The identified rotor was thereafter limited to a pre-recorded maximum speed from the look-up table.

It is preferred that where a rotor cannot not be identified by the signature moment of inertia, centrifuging will be aborted. Reprogramming will be required until the ultimate speed selected falls within an identifiable rotor or rotor category with an identifiable speed range.

Alternately, it can be possible to change the user identified ultimate speed to the determined maximum safe speed. This is not preferred as the centrifuge will be performing at a speed other than the originally programmed speed by the user.

It will be appreciated that torque could as well be computed. This is shown with respect to FIG. 3.

Figure 3:
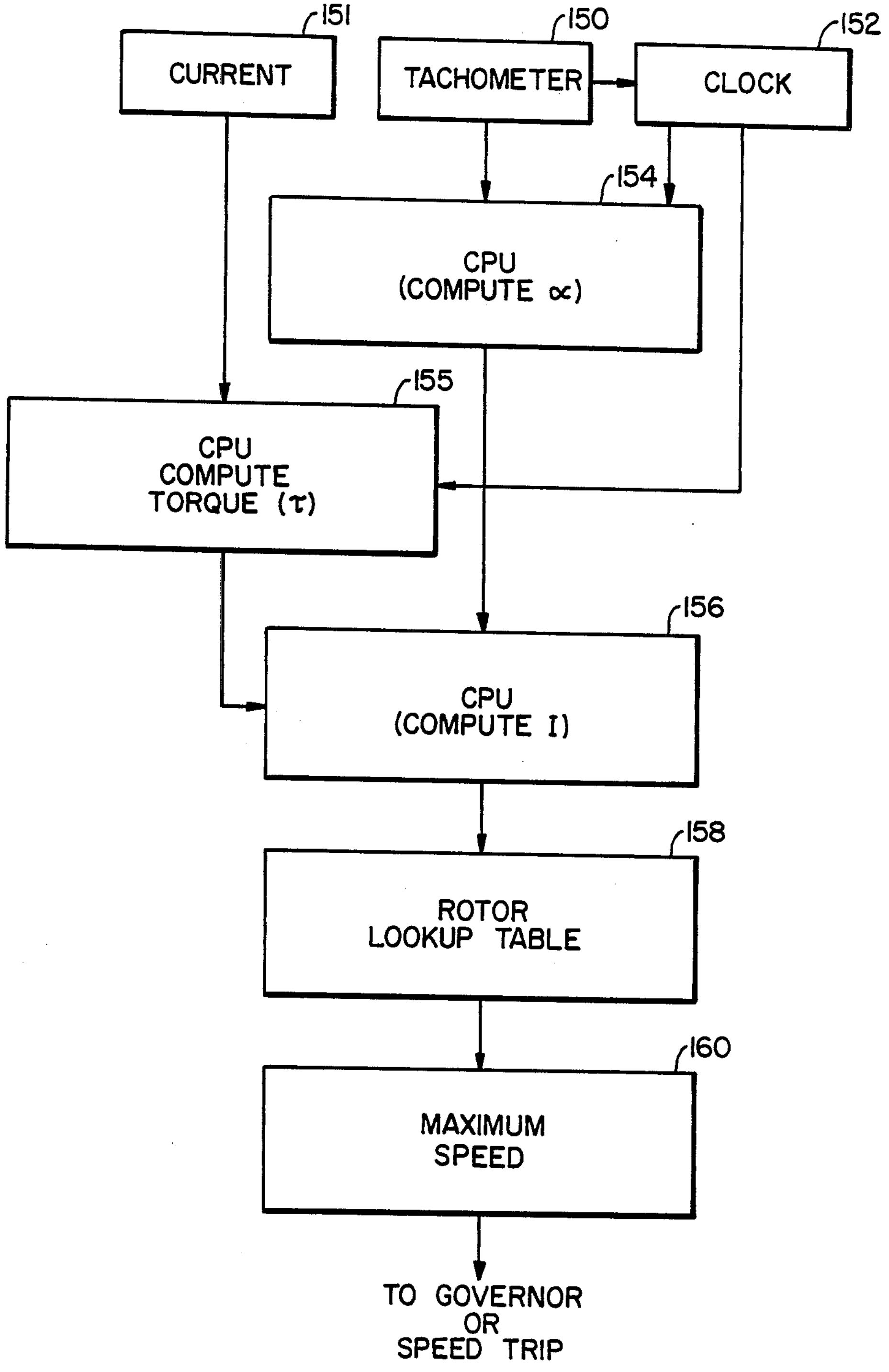
FIG. 3 is a computer flow diagram similar to that illustrated with respect to FIG. 2 with the exception that torque is additionally computed from current input to the motor.

Referring to FIG. 3, tachometer 150 outputs a signal to clock 152 at 15,000 rpm. A second signal is output at 20,000 rpm. Angular acceleration is computed at step 154. Current is measured at 151. Preferably, and at step 155, torque is computed. It will be appreciated that if torque and current are held constant, computation of torque will be simplified.

Thereafter, the moment of inertia is computed at 156. Output of the computed moment of inertia is to a look-up table 158 with a maximum speed output from the table at 160. This look up may be conventionally implemented by using the computed moment of inertia as an address and maintaining the maximum permitted speed at the address in memory. The maximum allowed speed is output to a governor or speed trip.

Figure 4:
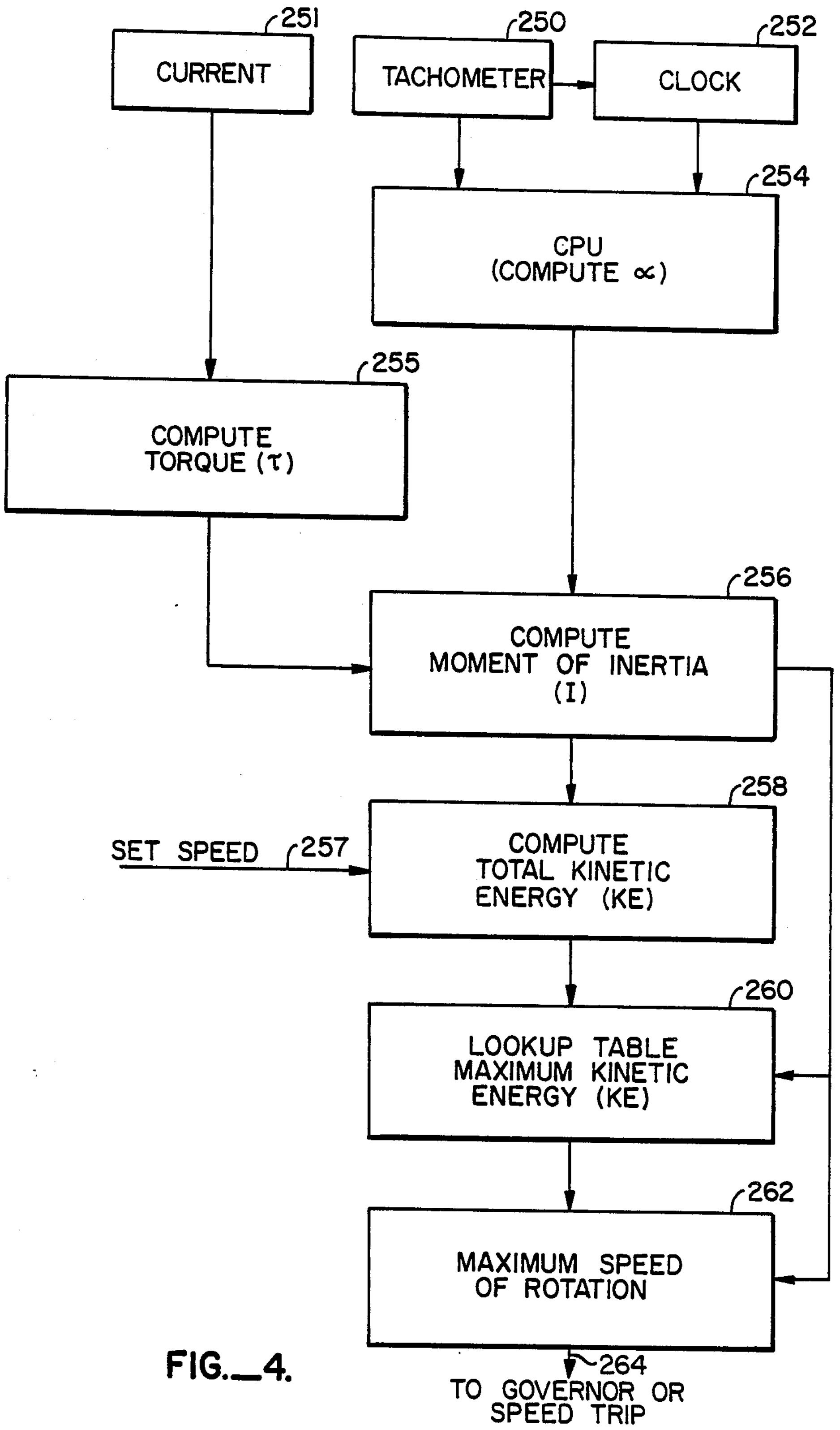
FIG. 4 is a computer flow diagram wherein the identity of the rotor is unknown and both the moment of inertia and the anticipated total kinetic energy are computed and compared to a look-up table for determining safe kinetic energy and computing from the safer kinetic energy, and, the limiting safe speed.

Finally, and referring to FIG. 4, a protocol for the limitation of energy is illustrated. In this protocol, the computed moment of inertia is utilized to determine the maximum amount of kinetic energy the rotor can tolerate. Thereafter, the maximum kinetic energy that the rotor can tolerate is utilized to compute a speed limitation.

Figure 5:
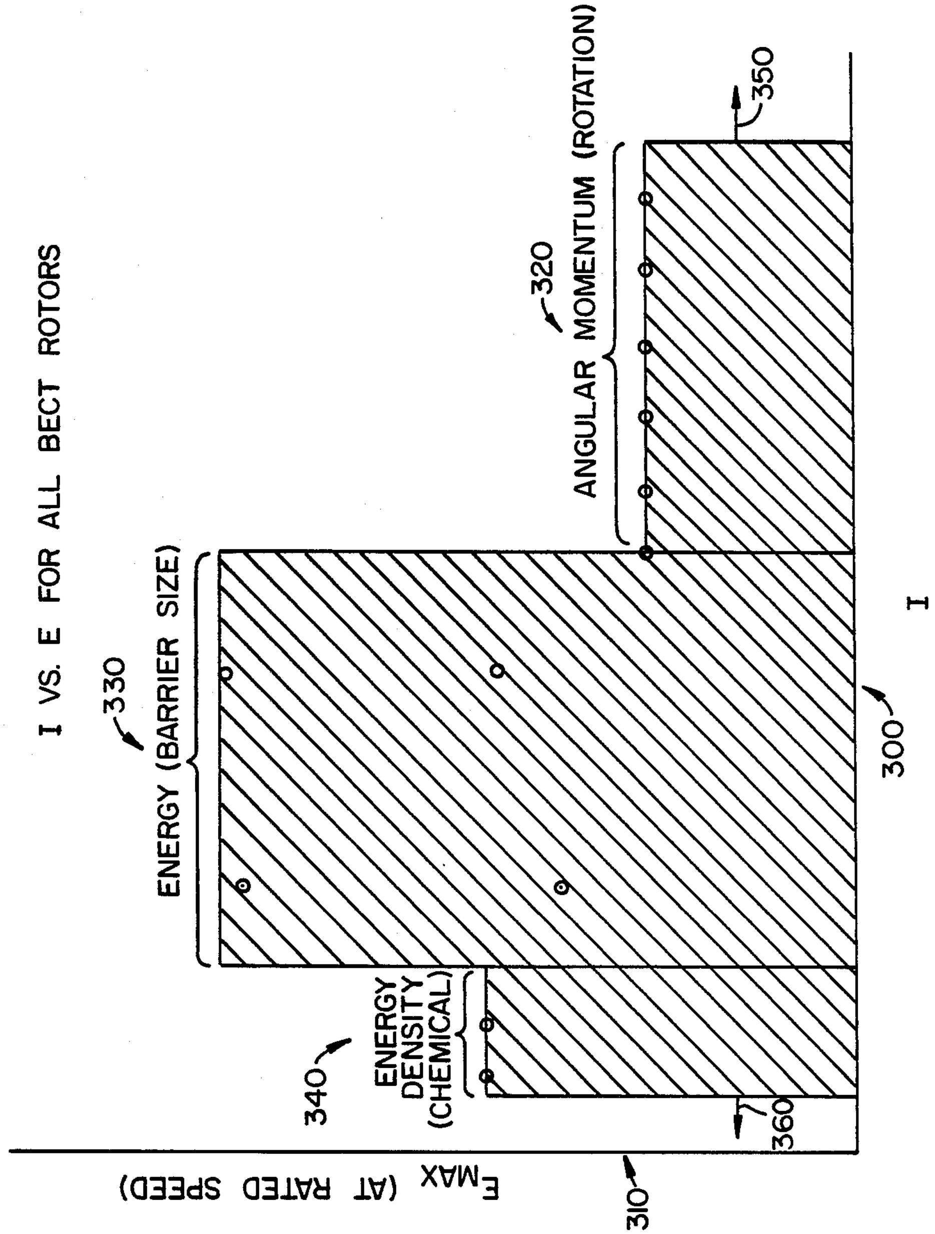
FIG. 5 illustrates a plot of total energy related to moment of inertia illustrating the setting of kinetic energy limits not to be exceeded for all types of rotors.

Referring to FIG. 5, a graphic classification of rotors is illustrated. Specifically, most of inertia is shown plotted on the abscissa 300 with maximum energy at rated speed plotted on the ordinate 310.

As previously discussed, rotor causalities can be divided into three areas with respect to the moment of inertia I. The first area 320 is for large diameter rotors having large moments of inertia with relatively great angular momentum. Referring to area 320, these rotors upon rotor casualty dissipate large amounts of angular momentum. The angular momentum can cause the machines in which such rotors are mounted to physically turn or move and possibly injure personnel standing by.

As the moment of inertia decreases, the ability of the rotor to control energy can increase. A rotor area 330 is described in which rotor's primary effect upon disintegration will be impact of the containment belt. To date, produced centrifuges have had containment rings sufficient to adsorb all energy of impact. Present centrifuges having relatively high rotor speeds are becoming heavy with their respective containment ring systems. The reader will appreciate that as speeds increase it may be impracticable in the future to mechanically contain rotor disintegrations because of the ultimate size and weight of the centrifuge. Where a design decision to do away with mechanical containment systems has been made, it will be appreciated that the rotor protection system disclosed herein could be substituted for presently used mechanical containments.

Finally, the chart shows an area 340 for rotors having a small moment of inertia and a very high speed of rotation. Such rotors are suspected to undergo chemical reactions upon rotor casualties as large amounts of energy are in effect instantly discharged. Here, energy is limited to a value between the angular momentum value 320 and the barrier value 330.

It will be appreciated that the kinetic energy varies as one-half the square of the angular velocity. Therefore, velocity within all three categories 320, 330 and 340 will vary.

It is further noted that for extremely low moments of inertia (no rotor installed) and extremely high moments of inertia (mechanical friction preventing rotation), the system illustrated can immediately detect these in effect "out of range areas" 350 (high moment of inertia) and 360 (low moment of inertia).

It further will be realized that the graph of FIG. 5 can be implanted in computer memory either in the form of a look-up table or alternatively using "less than" and "greater than" type functions in conjunction with conventional computer programming languages.

Having set forth the profile of a look-up table, the embodiment illustrated in FIG. 4 can now be set forth.

Referring to 250, a tachometer again outputs two signals. A first signal at 15,000 rpm and a second signal at 20,000 rpm. The signal is received at a clock 252 which outputs to a computer $\alpha$ step at 254.

Preferably current is limited at 252. Therefore, torque can be computed at step 255. Knowing torque and angular velocity enables the computation o the moment of inertia at 256.

Once the moment of inertia is known, the maximum speed for the particular centrifuging operator is input at 257. The total energy to be achieved is computed at 258.

Using the computed moment of inertia from step 256, a look-up table is addressed at 260 with the computed moment of inertia. The look-up table outputs the maximum kinetic energy which the rotor will be permitted to accumulate.

Thereafter, and at step 262, the maximum speed of rotation is computed. This maximum speed of rotation is then output at 264 to conventional governor or speed trip apparatus. It will be noted that with the apparatus shown it was not necessary to take from the rotor any identification information whatsoever. Merely by computing the amount of inertia and limiting the rotor to accumulated energies relative to the moment of inertia, a speed limit was determined.

It will be appreciated that two special cases are easily handled by this apparatus. First, where the moment of inertia is high—for example when the rotor is stuck—shut down can occur. Second, where the moment of inertia is low—for example—when no rotor is installed, shut down can likewise occur.

The reader will understand that a program for determining the moment of inertia has in fact been implemented using a 68,000 central processing unit, a product of Motorola Corporation of Sunnyvale, Calif. The program herein disclosed was implemented on a Greenhills Pascal compiler, a software product of the Greenhills Corporation of Newark, N.J. The entirety of the disclosed inertial calculation is in Pascal.

The reader will understand that certain of the stated functions and constants must be particularized to the particular machine operating system and machine being utilized. In accordance with the preferred embodiment, constant current and hence constant torque are assumed to be generated by the driving motor.

In operation, the computing microprocessor is initialized as not having made an inertial calculation. Thereafter, and when the rotor reaches 15,000 revolutions per minute, a timer is started. When the rotor reaches 20,000 revolutions per minute, the timer is stopped and the elapsed time measured.

At this juncture, it is known how long the rotor took with torque to traverse a known angle. The inertia is therefore computable.

Thereafter, the maximum safe speed of the rotor can be determined from any of the foregoing examples. Here, the known maximum kinetic energy capable of restraint by the machine containment belts was utilized to compute maximum rotor speed.

The code listing is as follows:

```
PROCEDURE Init__inertia;
    BEGIN
    inertia__being measured    := false;
    inertia__calculated        := false;
    inertia__timer       := 0;
    max__spd__inertia  := max__inertia__speed;
    END; { Init__inertia }
PROCEDURE Inertia__speed;
{     (VAR inertia__timer: int;
{            true__speed   : int; } Pass it in to avoid any interrupt effects. }
{      VAR inertia__being__measured,
{            inertia__calculated: boo)
{}                                          INTERN;
{Determines the inertia of the rotor one time during runs that exceed
{ 20 kRPM.
{}
    CONST
        {passed__spd__to__rad__per__sec       =        1.047; { 10's of RPM * 10 * 2pi/60      }
        { max__machine__ke                    =    600000.0  ; { ft-lbs of kinetic energy      }
        { torque                              =         0.20 ; { ft-lbs between 15-20 KRPM     }
        { Equation for combined constants = ????
        {}
        combined constants            =  5.7306590E7;
        low__inertia__meas__spd       =      15000; { rpm }
        high__inertia__meas__spd      =      20000; { rpm }
BEGIN
IF (NOT inertia__calculated)
    AND (machine__state = running)
THEN
    IF inertia__being__measured
    THEN
        BEGIN
        inertia__timer        := Succ (inertia__timer);
        If true__speed      >= high__inertia__meas__spd
        THEN
            BEGIN
            max__spd__inertia := Round (SQRT ((true__speed - start__spd__actual)
                                   * combined__constants / inertia__timer));
            inertia__being__measured    := false;
            inertia__calculated         := true;
Print file "SPD.P"
                END;
            END
        ELSE
            IF true__speed >= low__inertia__meas__spd
            THEN
                BEGIN
                start__spd__actual := true__speed;
                inertia__being__measured := true;
                END;
            END; { Inertia__speed }
```

It will be appreciated that this invention will admit of modification.

What is claimed is:

1. In a centrifuge system having a centrifuge rotor mounted on a shaft, said shaft and rotor driven by a motor toward a user selected speed, a method of rotor protection through speed control comprising the steps of:

accelerating said rotor through a first speed and through a second and higher speed toward the user selected speed under constant torque, said first speed and said second speed both being below said user selected speed;

recording a first instant of time said rotor passes through said first speed;

recording a second instant of time said rotor passes through said second speed;

computing angular acceleration from said first time and said first speed and said second time and said second speed;

computing moment of inertia of said rotor utilizing said computer angular acceleration and said constant torque;

determining from said computed moment of inertia the maximum speed of rotation of said rotor; and, limiting said speed of said rotor to said maximum speed of rotation when said maximum speed of rotation is less than said user selected speed.

2. The method of claim 1 and wherein said limiting step includes:

stopping said centrifuge rotor when said user selected speed of rotation of said rotor is greater than said determined maximum speed of rotation.

3. The method of claim 1 and wherein said limiting step includes:

limiting the speed of said centrifuge rotor to said determined maximum speed of rotation of said rotor by accelerating said rotor only to said determined maximum speed.

4. The method of claim 1 and wherein said determining step comprises the steps of:

recording the moment of inertia for a plurality of discrete rotors used with said centrifuge system in a CPU memory;

recording the maximum speed of each of said plurality of discrete rotors in said CPU memory, each recorded maximum speed corresponding to a recorded moment of inertia;

comparing the computed moment of inertia with the recorded moments of inertia to determine a single recorded moment of inertia to which the computed moment of inertia corresponds; and setting the maximum speed of rotation of said rotor as the recorded maximum speed corresponding to said single recorded moment of inertia.

5. The method of claim 1 and wherein said determining step comprises the steps of:

recording the moment of inertia for a plurality of discrete rotors used with said centrifuge system in a look-up table provided in a CPU memory;

recording the maximum speed of each of said plurality of discrete rotors in said look-up table, each recorded maximum speed corresponding to a recorded moment of inertia; and looking up said rotor in said look-up table by comparing said computed moment of inertia with the recorded moments of inertia;

wherein said limiting step comprises stopping said rotor when said computed moment of inertia does not correspond to a recorded moment of inertia.

6. The method of claim 1 and wherein said determining step includes the steps of:

recording discrete ranges of moments of inertia in a CPU memory;

recording discrete kinetic energies in said CPU memory, each recorded kinetic energy corresponding to a recorded range of moments of inertial; and determining from said discrete kinetic energies and said computed moment of inertia the maximum speed of rotation of the rotor.

7. In a centrifuge system having a rotor mounted on a shaft, said shaft and rotor driven by a motor having an input current, and a speed control for receiving a user selected speed and accelerating said rotor from a stationary rotational velocity toward said user selected speed, a method of rotor protection through speed control comprising:

accelerating said rotor from said stationary rotational velocity towards said user selected speed;

taking a first speed measurement below said user selected speed at a first point in time during said acceleration;

taking a second speed measurement below said user selected speed and at a speed exceeding said first speed measurement at a second point in time later than said first point in time during said acceleration;

computing angular acceleration from said first and second speed measurements and said first and second points in time;

measuring the current to said motor between said first and second points in time;

computing the torque exerted on said motor using said measured current between said first and second points in time;

computing from said angular acceleration and torque the moment of inertia of said rotor;

utilizing the moment of inertia to look up a maximum speed limitation for said rotor; and, limiting the speed of rotation of said rotor to said maximum speed limitation when the maximum speed limitation is less than the user selected speed.

8. The method of claim 7 and wherein said limiting step includes:

stopping said centrifuge rotor when said user selected speed of rotation of said rotor is greater than said maximum speed limitation.

9. The method of claim 7 and wherein said limiting step includes:

limiting the speed of said centrifuge rotor to said determined maximum speed of rotation of said rotor by accelerating said rotor only to said determined maximum speed.

10. In the combination of a centrifuge system having a rotor mounted on a shaft, a motor for driving said shaft and accelerating said rotor to a user selected speed, and a control for controlling the acceleration of said rotor to said user selected speed, the improvement in said control comprising:

means for determining the angular acceleration of said rotor over a preselected period of time;

means for determining the torque exerted on said rotor during said preselected period of time;

means for computing the moment of inertia of said rotor operably connected to said means for determining the angular acceleration and the means for determining the torque exerted on said rotor;

means for determining from said computed moment of inertia of said rotor the maximum speed of rotation of said rotor; and, means for limiting the speed of the rotor to said maximum speed of rotation when the maximum speed is less than the user selected speed.

11. In the combination of claim 10 wherein said means for limiting the speed of the rotor includes means for stopping said centrifuge rotor when said user selected speed is greater than said maximum speed of rotation of said rotor.

12. The combination of claim 10 and wherein said means for limiting the speed of the rotor includes means for accelerating said rotor only to said maximum speed of rotation of said rotor.

13. The combination of claim 10 and further comprising:

memory means for storing the moment of inertia for a plurality of discrete rotors used with said centrifuge system and for storing the maximum speed of each of said plurality of discrete rotors, each stored maximum speed corresponding to a stored moment of inertia;

wherein said means for determining the maximum speed of rotation compares the computed moment of inertia with the stored moments of inertia to determine a single stored moment of inertia to which the computed moment of inertia corresponds, and sets the maximum speed of rotation of said rotor as the stored maximum speed corresponding to said single stored moment of inertia.

14. The combination of claim 10 and further comprising:

memory means for storing the moment of inertia for a plurality of discrete rotors used with said centrifuge system and for storing the maximum speed of each of said plurality of discrete rotors, each stored maximum speed corresponding to a stored moment of inertia;

wherein said means for determining the maximum speed of rotation compares the computed moment of inertia with the stored moments of inertia to determine a single stored moment of inertia to which the computed moment of inertia corresponds, and when said computed moment of inertia does not correspond to a single stored moment of inertia, said limiting means stops said centrifuge rotor.

15. The combination of claim 10 and further comprising:

memory means for storing discrete ranges of moments of inertia and for storing discrete kinetic energies, each stored kinetic energy corresponding to a stored range of moments of inertia;

wherein said means for determining the maximum speed of rotation uses said discrete kinetic energies and said computed moment of inertia.

16. The combination of claim 10 and wherein said means for determining angular acceleration comprises:

means for measuring the angular velocity of said rotor;

means for recording the angular velocity of said rotor at a first instant of time and recording the angular velocity of said rotor at a second and later instant of time;

means for computing the angular acceleration of said rotor from said recorded angular velocities and said first and second instants of time.

17. In a centrifuge system having a rotor mounted on a shaft, said shaft and rotor being accelerated by a motor toward a user selected speed, a method of rotor protection through speed control comprising:

the steps of accelerating a suspect rotor towards said user selected speed;

determining angular acceleration of said suspect rotor over a preselected time period;

determining a torque exerted to accelerate said rotor over said preselected time period;

computing from said angular acceleration and torque the moment of inertia of said rotor;

utilizing said computed moment of inertia to determine a total kinetic energy limit of said rotor;

computing the maximum speed of said rotor utilizing said total kinetic energy limit; and, limiting the speed of said rotor to said computed maximum speed when the computed maximum speed is less than the user selected speed.

* * * * *